United States Patent
Bianco Mengotti et al.

(10) Patent No.: US 12,071,232 B2
(45) Date of Patent: Aug. 27, 2024

(54) CONVERTIPLANE

(71) Applicant: LEONARDO S.P.A., Rome (IT)

(72) Inventors: Riccardo Bianco Mengotti, Samarate (IT); Paolo Brughera, Samarate (IT); Luca Sampugnaro, Samarate (IT); Carlo Cassinelli, Samarate (IT)

(73) Assignee: LEONARDO S.P.A., Rome (IT)

( * ) Notice: Subject to any disclaimer, the term of this patent is extended or adjusted under 35 U.S.C. 154(b) by 140 days.

(21) Appl. No.: 17/786,194

(22) PCT Filed: Dec. 17, 2020

(86) PCT No.: PCT/IB2020/062130
§ 371 (c)(1),
(2) Date: Jun. 16, 2022

(87) PCT Pub. No.: WO2021/124213
PCT Pub. Date: Jun. 24, 2021

(65) Prior Publication Data
US 2023/0025366 A1 Jan. 26, 2023

(30) Foreign Application Priority Data

Dec. 17, 2019 (EP) .................................... 19217218

(51) Int. Cl.
| | |
|---|---|
| B64C 29/00 | (2006.01) |
| B64C 1/20 | (2006.01) |
| B64C 1/22 | (2006.01) |
| B64C 3/52 | (2006.01) |
| B64C 27/22 | (2006.01) |
| B64D 27/02 | (2006.01) |
| B64D 27/24 | (2024.01) |

(Continued)

(52) U.S. Cl.
CPC ............ B64C 29/0033 (2013.01); B64C 1/20 (2013.01); B64C 1/22 (2013.01); B64C 3/52 (2013.01);
(Continued)

(58) Field of Classification Search
CPC ....... B64C 29/0033; B64C 3/56; B64C 3/546; B64C 1/22
See application file for complete search history.

(56) References Cited

U.S. PATENT DOCUMENTS 4,114,839 A * 9/1978 Sibley .................... B64D 47/08
244/118.3
7,806,368 B1 10/2010 Smith et al.
(Continued)

FOREIGN PATENT DOCUMENTS

| EP | 1057724 A2 * | 12/2000 | ......... B64C 29/0033 |
|---|---|---|---|
| EP | 1057724 A2 | 12/2000 | |

(Continued)

OTHER PUBLICATIONS

International Search Report and Written Opinion in corresponding International Patent Application No. PCT/IB2020/062120 mailed Mar. 3, 2021 (21 pages).

(Continued)

*Primary Examiner* — Philip J Bonzell
*Assistant Examiner* — Eric Acosta
(74) *Attorney, Agent, or Firm* — Leason Ellis LLP

(57) ABSTRACT

A convertiplane is described that comprises: a fuselage, having a first longitudinal axis and, in turn, comprising a nose and a tail portion; a pair of wings arranged on respective opposite sides of the fuselage, carrying respective rotors and generating a lift value; and a pair of engines operatively connected to respective rotors; each rotor comprising a mast rotatable about a second axis between a helicopter configuration and an aeroplane configuration; each rotor is interposed between the fuselage and the relative rotor along the direction of extension of the relative wing.

10 Claims, 16 Drawing Sheets

(51) Int. Cl.
  *B64D 29/00* (2006.01)
  *B64D 35/04* (2006.01)
  *B64D 35/08* (2006.01)
  *H02K 7/18* (2006.01)

(52) U.S. Cl.
  CPC .............. *B64C 27/22* (2013.01); *B64D 27/24* (2013.01); *B64D 29/00* (2013.01); *B64D 35/04* (2013.01); *B64D 35/08* (2013.01); *H02K 7/1861* (2013.01); *B64D 27/026* (2024.01)

(56) References Cited

U.S. PATENT DOCUMENTS

| | | | |
|---|---|---|---|
| 10,011,349 B2* | 7/2018 | Ivans | B64C 5/08 |
| 10,384,774 B2* | 8/2019 | Vondrell | H02J 7/0042 |
| 2014/0263854 A1 | 9/2014 | Ross et al. | |
| 2017/0158323 A1 | 6/2017 | Ross et al. | |
| 2017/0297698 A1 | 10/2017 | Alber et al. | |

FOREIGN PATENT DOCUMENTS

| | | |
|---|---|---|
| EP | 3254952 A1 | 12/2017 |
| WO | 2018218321 A1 | 12/2018 |

OTHER PUBLICATIONS

International Preliminary Report on Patentability in corresponding International Patent Application No. PCT/IB2020/062120 mailed Mar. 16, 2022 (15 pages).

Written Opinion of the International Preliminary Examining Authority in corresponding International Patent Application No. PCT/IB2020/062120 mailed Apr. 9, 2021 (4 pages).

* cited by examiner

FIG. 1

CONVERTIPLANE

CROSS-REFERENCE TO RELATED APPLICATIONS

This patent application is a U.S. National Phase Application under 35 U.S.C. § 371 of International Patent Application No. PCT/IB2020/062130, filed on Dec. 17, 2020, which claims priority from European patent application no. 19217218.7 filed on Dec. 17, 2019, the entire disclosure of which is incorporated herein by reference.

TECHNICAL FIELD

The present invention relates to a convertiplane.

BACKGROUND ART

In the aviation industry, aeroplanes are normally used for high cruising speeds, in particular above 150 knots and at high altitudes, for example above 30,000 feet. For high cruising speeds and altitudes, aeroplanes use fixed wings to generate the lift necessary for sustaining the aeroplane in the air. A sufficient amount of such lift can only be achieved by accelerating the aeroplane on relatively long runways. These runways are also needed to allow aeroplanes to land.

Contrariwise, helicopters normally have lower cruising speeds than aeroplanes and generate the necessary lift through rotation of the main rotor's blades. In consequence, helicopters can take-off/land without the need for horizontal speed and using particularly small surfaces. Moreover, helicopters are capable of hovering and of flying at relatively low altitudes and speeds, thereby being particularly easy to handle and suitable for demanding manoeuvres, such as mountain or sea rescue operations.

Nevertheless, helicopters have intrinsic limits regarding the maximum operating altitude, which is around 20,000 feet and the maximum operating speed, which cannot exceed 150 knots.

In order to meet the demand for aircrafts capable of having the same manoeuvrability and flexibility of use of the helicopter and, at the same time, overcome the intrinsic limits indicated above, convertiplanes are known.

An example of a convertiplane is described in the patent application U.S. Pat. No. 10,011,349.

In greater detail, the convertiplane described in the aforementioned application basically comprises:
- a fuselage extending along a first longitudinal axis;
- a wing projecting in a cantilever fashion and formed by a pair of wings arranged on respective opposite sides of the fuselage and having respective free ends opposite to the fuselage and aligned along a second transversal axis substantially orthogonal to the first longitudinal axis; and
- a V-shaped tail portion projecting from the fuselage in a rearward position with respect to the wing.

The convertiplane also comprises:
- a pair of nacelles housing the respective engines; and
- a pair of rotors rotatable about respective third axes and operatively connected to the respective engines.

The rotors are tiltable with respect to the wing about a fourth axis, preferably parallel to the second axis.

Each rotor comprises, in a known manner, a mast rotatable about the relative third axis and a plurality of blades hinged on the mast, in particular angularly equispaced along the circumference around the free end of the mast that protrudes from the respective nacelle.

More in particular, the blades of each rotor extend along respective longitudinal axes, which are transversal to the relative third axis.

The rotors are connected together by an interconnection shaft, which ensures the operation of both the rotors in the event of failure of one of the engines. Furthermore, the engines are carried on respective wings mutually opposite to each other with respect to the fuselage.

More in particular, the engines are arranged with the respective rotors, i.e. at the same distance of the respective rotors with respect to the fuselage.

In the embodiment described in the abovementioned application, the engines are fixed with respect to the fuselage and the wings.

In consequence, the convertiplane described in the abovementioned patent application comprises a pair of transmissions, each interposed between a respective engine and the respective rotor.

In particular, each transmission comprises a fixed part connected to the respective engine and a movable part connected to the respective rotor.

Convertiplanes are also able to selectively assume:
- an "aeroplane" configuration, in which the rotors are arranged with respective third axes substantially parallel to the first axis of the convertiplane and coaxial to the respective engines; or
- a "helicopter" configuration, in which the rotors are arranged with the respective third axes substantially vertical and transversal to the first axis of the convertiplane and orthogonal to the respective engines.

Due to the possibility of tilting the rotors, convertiplanes are able to take-off and land like a helicopter, i.e. in a direction substantially perpendicular to the first longitudinal axis of the convertiplane, without the need of a runway.

Furthermore, convertiplanes are able to take-off and land on rough terrain or ground not normally prepared for such manoeuvres.

In addition, convertiplanes are capable of hovering when in the "helicopter" configuration.

Convertiplanes can also reach and maintain cruising speeds of approximately 250-300 knots and flight altitudes of up to approximately 20,000 feet when in the "aeroplane" configuration.

This cruising speed is much higher than the value of roughly 150 knots defining the maximum cruising speed of the helicopters.

Similarly, the abovementioned altitude is much higher than that typical of helicopters and enables convertiplanes in the "aeroplane" configuration to avoid the clouds and bad weather conditions typical of lower altitudes.

There is awareness in the industry of the need to facilitate the disassembly of the wing and its associated accessories in order to aid the rapid loading of particularly bulky loads on the convertiplane.

There is also awareness in the industry of the need to reduce as far as possible the length of the interconnection shaft and, at the same time, reduce the flexural loads acting on the wing.

There is awareness in the industry of the need to reduce as far as possible the aerodynamic resistance caused by the geometric discontinuities associated with the fuselage-wing and wing-engine interfaces, so as to also reduce the radar track of the convertiplane.

There is also awareness in the industry of the need to equip the convertiplane with weaponry or further equipment normally housed inside the fuselage and extractable during flight of the convertiplane, while interfering as little as possible with the overall architecture of the convertiplane.

US-A-2014/263854 discloses a convertiplane according to the preamble of claim 1.

U.S. Pat. No. 10,384,774 discloses a method for operating a propulsion system of an aircraft includes moving a plurality of forward and aft propulsors to a vertical thrust position. While in the vertical thrust positions, the method also includes providing a first forward to aft ratio of electric power to the plurality of forward and aft propulsors. The method also includes moving the plurality of forward and aft propulsors to a forward thrust position. While in the forward thrust positions, the method also includes providing a second forward to aft ratio of electric power to the plurality of forward and aft propulsors. The first forward to aft ratio of electric power is different than the second forward to aft ratio of electric power to provide certain efficiencies for the aircraft.

US-A-2017/297698 discloses an aircraft including a fuselage defining an aircraft attitude axis. The fuselage houses an engine fixed relative to the aircraft attitude axis. A rotor assembly is operatively connected to rotate back and forth relative to the aircraft attitude axis from a first position predominately for lift to a second position predominately for thrust. The rotor assembly includes a rotor that is operatively connected to be driven by the engine.

U.S. Pat. No. 4,114,839 discloses an assembly for mounting, supporting and releasably holding a vertically positioned aerial photography camera, and an angularly adjustable obliquely positioned aerial photography camera, in an aircraft having a downwardly and outwardly opening ramp to which the assembly is removably attached, and also having an upwardly and inwardly opening tail door, where the ramp and the door are openable and closeable during flight of the aircraft. The assembly includes: a lower member subassembly in the form of a rectangular frame; and, two upper member subassemblies, each of which carries one of the cameras. These upper subassemblies are rectangular-like in form and are detachably connected to, and slidably movable horizontally above, the lower subassembly. In flight, with the ramp and the door open, the upper assemblies are separately extendable beyond the ramp, and aerial photographs may be taken.

U.S. Pat. No. 7,806,368 discloses roll-on/roll-off, aircraft-borne sensor pod deployment system having an operator station and a sensor pallet system and method of using same. The operator station has a base platform, a shelter box mounted on the base platform for accommodating a human operator, and a computer installed inside the shelter box. The sensor pallet system has a base platform, a linear system mounted on the base platform, a rotational system mounted on the linear system, a mechanical arm attached to the rotational system, a sensor pod attached to the mechanical arm, and an electrical control system that provides power to the deployment system and controls movements of the sensor pallet system. In operation, the sensor pod can be retracted into a compact, stowing position, or extended out an opening in the aircraft for an unobstructed field of view. The deployment system optionally includes an apparatus and method for sealing the aircraft opening.

DISCLOSURE OF INVENTION

The aim of the present invention is the manufacture of a convertiplane that enables to satisfy at least one of the above-specified needs in a simple and inexpensive manner.

According to the invention, this aim is achieved by a convertiplane as claimed in claim 1.

BRIEF DESCRIPTION OF THE DRAWINGS

For a better understanding of the present invention, three non-limitative preferred embodiments are described hereinafter, purely by way of example and with the aid of the accompanying drawings, in which:

FIG. 1 is a perspective view of a first embodiment of a convertiplane made according to the dictates of the present invention and arranged in the "helicopter" configuration;

BEST MODE FOR CARRYING OUT THE INVENTION

Figure 1:
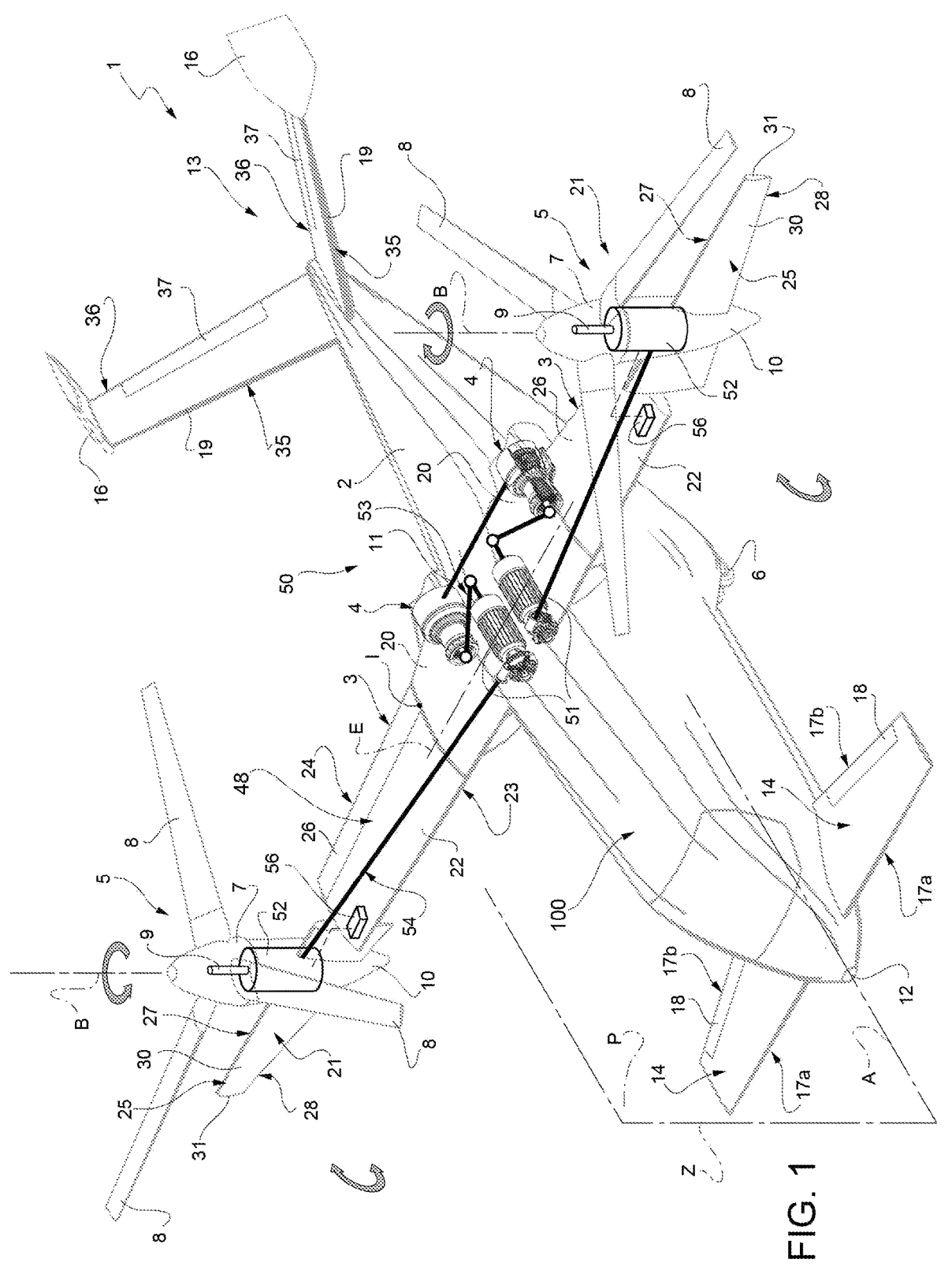
Figure 2:
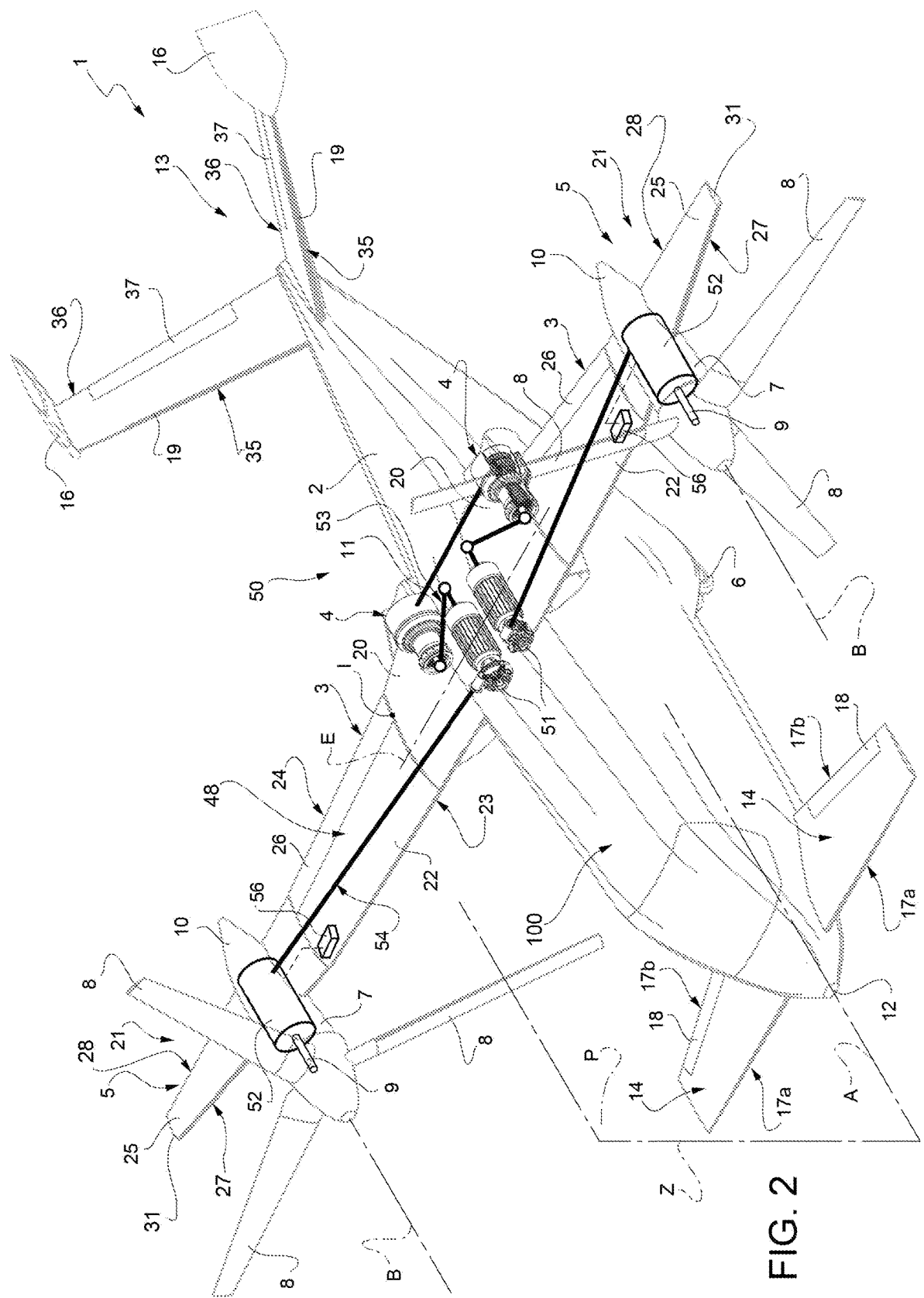
FIG. 2 is a perspective view of the convertiplane of FIG. 1 in the "aeroplane" configuration.
Figure 3:
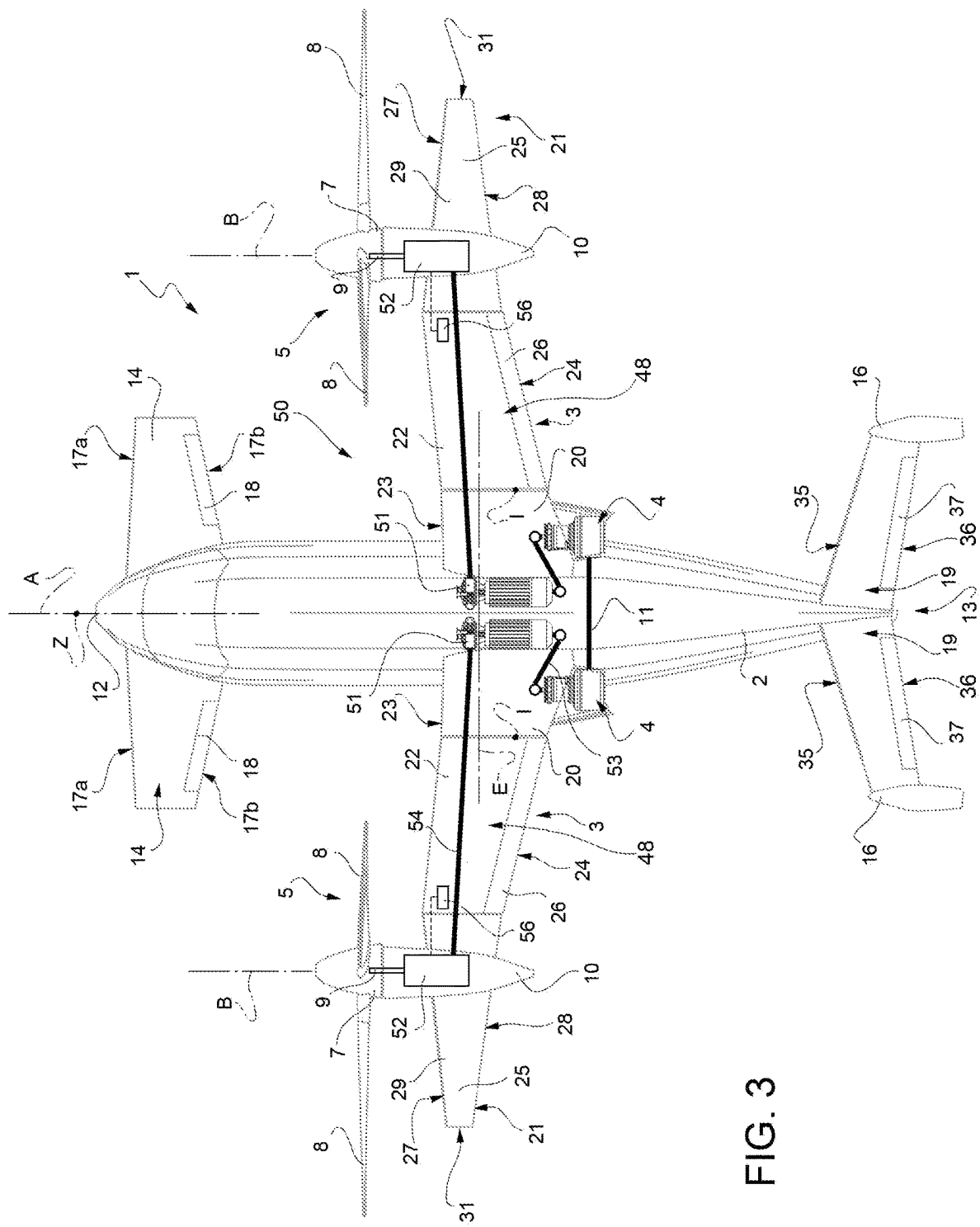
FIG. 3 is a plan view of the convertiplane of FIGS. 1 and 2 in the "aeroplane" configuration.

Referring to FIGS. 1 to 9, reference numeral 1 indicates an aircraft capable of hovering, in particular a convertiplane.

It should be noted that hereinafter in this description, terms such as "above", "below", "at the front", "at the rear" and the like are used with reference to forward flight or hovering conditions of the convertiplane 1 shown in FIGS. 1 and 2.

The convertiplane 1 basically comprises:
a fuselage 2 having an axis A of longitudinal extension;
a pair of wings 3 extending in a cantilever fashion from respective mutually opposite sides of the fuselage 2 and transversely to the axis A;
a pair of engines 4 carried by respective wings 3; and
a pair of rotors 5 operatively connected to respective engines 4 and rotatable about respective axes B.

The convertiplane 1 further comprises a pair of nacelles 10 housing respective rotors 5.

The convertiplane 1 further comprises a plurality of undercarriages 6 arranged below the fuselage 2 with reference to a normal operating position of the convertiplane 1 shown in FIG. 2.

Each wing 3 basically comprises:
- a leading edge 23 and a trailing edge 24 opposite to each other; and
- a control surface 26 movable with respect to the wing 3.

Each wing 3 also comprises a median line equispaced from the respective leading edge 23 and trailing edge 24.

Each wing 3 also comprises a top surface 48 and a bottom surface 49 opposite to each other and both extending between the leading edge 23 and the trailing edge 24.

In particular, each top surface 48 delimits the respective wing 3 from above, i.e. on the side opposite to the relative undercarriage 6. Each bottom surface 49 delimits the respective wing 3 from below, i.e. on the side of the relative undercarriage 6.

In the embodiment shown, each wing 3 is a monoplane wing.

The convertiplane 1 further comprises an axis E transversal to the axis A.

In the case shown, the axis E is orthogonal to the axis A and arranged horizontally in a plan view of the convertiplane 1.

Alternatively, the convertiplane comprises a pair of axes E associated with respective wings 3. Each axis E is parallel to the median line of the relative wing 3 and could form a dihedral with respect to the fuselage 2.

Each wing 3 develops a lift along an axis Z orthogonal to the axes A and E.

Advantageously, each engine 4 is interposed between the fuselage 2 and the relative rotor 5 along the direction of extension of the relative said wing 3.

In a preferred embodiment, each engine 4 is interposed between the fuselage 2 and the relative rotor 5, proceeding along the direction of extension of the relative wing 3.

The convertiplane 1 also comprises an interconnection shaft 11, which enables the mechanical power connection between each engine 4 and the rotors 5 to ensure the operation of both the rotors 5 in the event of failure of one of the engines 4. The interconnection shaft 11 is shown in the accompanying figures by way of non-limitative example. Preferably, the interconnection shaft 11 is arranged on the fuselage 2 for the greater part of its length.

More in particular, the interconnection shaft 11 extends along its own axis orthogonal to the axis A and parallel to the axis E.

Furthermore, each engine 4 is arranged at a connection interface between said fuselage 2 and the relative wing 3.

More specifically, each engine 4 is arranged at a root portion of the relative wing 3.

In the case shown, each engine 4 is arranged below the relative wing 3 with reference to a normal operating configuration of said convertiplane 1.

In the case shown, the wings 3 are arranged above the fuselage.

In the case shown, the engines 4 are also arranged laterally to the fuselage 2.

Alternatively, and in a manner not shown, each wing 3 of the convertiplane 1 has at least one engine 4 installed on the top surface 48.

Alternatively, and in a manner not shown, each wing 3 of the convertiplane 1 has at least one engine 4 installed on the bottom surface 49.

Alternatively, and in a manner not shown, the fuselage 2 of the convertiplane 1 has at least one engine 4 installed on its own top surface 100 and on a longitudinal plane P of symmetry of the convertiplane 1.

Alternatively, and in a manner not shown, at least one engine 4 is housed at least partially inside the fuselage 2, preferably on a longitudinal plane P of symmetry of the convertiplane 1.

The plane P is parallel to the axes A and Z and orthogonal to the axis E (FIGS. 1 and 2).

The fuselage 2 also comprises a nose 12 arranged at the front and a tail portion 13, opposite each other along the axis A.

In the preferred embodiment of the present invention, the tail portion 13 of the convertiplane 1 also comprises a pair of surfaces 19 arranged in a V, tilted towards each other and symmetrical with respect to the axis A.

Each surface 19, in turn, comprises a fin 16 transversal to the respective surface 19, orthogonal in the case shown, and extending from both sides of the respective surface 19.

Preferably, the surfaces 19 define an angle between them ranging from 40 to 50 degrees, even more preferably 45 degrees.

In this way, the surfaces 19 of the convertiplane 1 develop a substantial aerodynamic force along the axis Z. This aerodynamic force provides lift or negative lift.

Alternatively, through a different combination of the surfaces 19 with respective fins 16, the tail portion 13 can be shaped like a H, M, T or cross.

In particular, the size of the projection in plan of the tail portion 13, independently of its geometric shape, is equal to at least 5%, preferably 10%, of the overall size of the wing 3 parallel to the axis E and seen from above in plan. In this way, in the "aeroplane" configuration of the convertiplane 1, the tail portion 13 contributes significantly to the balance and to the longitudinal stability of the convertiplane 1.

Each surface 19 comprises, in particular:
- a respective leading edge 35 and a respective trailing edge 36 opposite to each other; and
- a respective movable appendage 37 arranged on the respective trailing edge 36.

Preferably, the tail portion 13 is configured to generate a lift or negative lift on the convertiplane 1, i.e. a force directed upwards/downwards and acting against/with the weight force, as necessary in order to obtain the balance, stability and controllability of the convertiplane 1.

The convertiplane 1 can be selectively arranged:
- in a "helicopter" configuration (shown in FIG. 1), in which the axes B of the rotors 5 are orthogonal to the axis A and the axis E; and
- in an "aeroplane" configuration (shown in FIG. 2), in which the axes B of the rotors 5 are parallel to the axis A and orthogonal to the axis E.

In particular, the rotors 5 are of the "puller" type.

In the "aeroplane" configuration, the rotors 5 are arranged in front of the leading edges 23 of the wings 3 and towards the nose 12.

In the "helicopter" configuration, the rotors 5 are arranged above the wings 3 and on the opposite side of the undercarriage 6.

Each wing 3 comprises:
- a portion 20 extending along the axis E orthogonal to the axis A and fixed with respect to the fuselage 2;
- a tip portion 21 supporting the respective rotor 5 and the respective nacelle 10, and defining an aerodynamic surface 25; and an intermediate portion 22, which is interposed between the respective portion 20 and the respective tip portion 21.

Each portion 20 supports the relative engine 4.

In the case shown, each tip portion 21, the relative surface 25 and the relative rotor 5 are tiltable about the axis E integrally with the relative rotor 5, preferably by an angle ranging between 5 and 10 degrees.

The intermediate portion 22 of each wing 3 is hinged to the relative portion 20 about a respective axis I, and is movable with respect to portion 20 during the transformation of the convertiplane 1 from the "helicopter" configuration to a stowage configuration (not shown) so as to fold the respective wing 3 about the respective axis I, or during a step of removing equipment from the wings 3.

In the case shown, the axes I are incident in the longitudinal plane P, which is parallel to the axes A and Z and orthogonal to the axis E.

In particular, the axes I are convergent to one another on the opposite side of the fuselage 2 with respect to the undercarriages 6.

Alternatively, the axes I are convergent to one another on the side of the undercarriages 6 with respect to the fuselage 2.

In one embodiment that is not shown, the axes I are skew to facilitate folding of the wings 3 one over the other.

Each portion 20 and the respective intermediate portion 22 are integral with each other and extend along the axis E when the convertiplane 1 is in the "helicopter" configuration, in the "aeroplane" configuration and during the transition of the convertiplane 1 between the "helicopter" configuration and the "aeroplane" configuration.

Each tip portion 21 comprises a respective free end 31.

In greater detail, each tip portion 21 comprises, proceeding from the respective portion 22 from the side opposite to the axis A and along the axis E in the "aeroplane" or "helicopter" configurations, a section adjacent to the respective portion 22, the respective rotor 5 with the respective nacelle 10 and the respective free end 31.

When the convertiplane 1 is in the "aeroplane" configuration, the surfaces 25 define respective extensions of the respective portions 20 and the respective intermediate portions 22.

In this "aeroplane" configuration, a leading edge 27 of each surface 25 is arranged at the in front of the trailing edge 28 of the same surface 25, proceeding along the axis A.

In this way, the chord of the surfaces 25 is arranged substantially parallel to the axis A.

The tip portions 21 and the respective surfaces 25 present a minimum overall surface area comprising respective leading edges 27, 28 parallel to the axis A, and a maximum overall surface area defined by the respective top surface and bottom surface 29, 30 orthogonal to the axes A and E.

It is important to stress that when the convertiplane 1 is arranged in the "aeroplane" configuration, preferably, the tip portions 21 can be rotated about the axis E and tilted with respect to the axis A by a predetermined angle with respect to the relative wings 3 and rotors 5. In this way, it is possible to further vary the lift developed by the wings 3 without varying the lift coefficient of the wings 3.

Contrariwise, in the "helicopter" configuration, the leading edges 27 and trailing edge 28 are arranged orthogonally to the axis A and E. In this way, the chord of the surfaces 25 is arranged substantially orthogonal to the axes A and E and the interference of the surfaces 25 with the downwash of the respective rotors 5 is reduced.

Each surface 25 also comprises a top surface 29 and a bottom surface 30 extending from mutually opposite sides between the respective leading edges 27 and trailing edges 28.

The top surface 29 and bottom surface 30 are arranged orthogonally to the axis A when the convertiplane 1 is in the "helicopter" configuration.

More specifically, the leading edge 27 of each surface 25 is arranged above the respective trailing edge 28.

Preferably, the surfaces 25 have washout, i.e. the angle of incidence of the profiles of the surfaces 25 decreases proceeding from the respective wings 3 towards the respective free ends 31 opposite to the fuselage 2. In this way, the surfaces 25 further improve the overall aerodynamic efficiency of the arrangement formed by the wings 3 and the tip portions 21.

In one embodiment that is not shown, the surfaces 25 comprise respective movable appendages.

Each rotor 5 basically comprises:
a mast 9 rotatable about an axis B;
a hub 7 driven in rotation by the mast 9; and
a plurality of blades 8 hinged on the hub 7.

The axis E is transversal to the axis A and the axes B.

Since the rotors 5 are identical, reference will be made hereinafter to a single rotor 5.

The convertiplane 1 also comprises a pair of canards 14 arranged on the nose 12 of the fuselage 2 and defining respective surfaces designed to generate lift.

In greater detail, the canards 14 project in a cantilever fashion from respective mutually opposite sides of the fuselage 2.

In the case shown, the canards 14 are arranged on a lower portion of the nose 12.

In a different embodiment of the present invention, not shown in the accompanying figures, the canards 14 are arranged on an upper portion of the nose 12 of the convertiplane 1.

Preferably, the canards 14 are configured so as to generate a lift with a main component along the axis Z and counter the weight of the convertiplane 1.

Each canard 14 also comprises:
a respective leading edge 17a and a respective trailing edge 17b opposite to each other; and
a respective movable appendage 18 arranged on the respective trailing edge 17b.

The canards 14, the wings 3 and the tail portion 13 are arranged at progressively increasing distances from the undercarriage 6, proceeding from the nose 12 towards the tail portion 13.

Each engine 4 is housed (FIG. 8) in a casing 40.

The casing 40 is connected to a respective lateral side of the fuselage 2 and to the bottom surface 49 of the respective wing 3, in greater detail to the bottom surface 49 of the relative portion 20 of the respective wing 3.

In greater detail, the casing 40 of each engine 4 is formed by:
a pair of surfaces 41, 42 opposite each other and respectively arranged above and below; and
a pair of surfaces 43, 44 opposite each other, extending between the surfaces 41, 42, and respectively arranged on the side of the fuselage 2 and on the side of the respective rotor 5.

The casing 40 of each engine 4 also defines an air intake 46 for an airflow and an exhaust 47 opposite to the air intake 46 in a direction substantially parallel to the axis A.

The surface 41 is connected to the bottom surface 45 of the respective wing 3.

The surface 43 is connected to the fuselage 2.

Preferably, the surface 43 next to the fuselage 2 has a connection portion shaped so as to form a kind of recess 101 developing mainly with respect to the axis A.

Each recess 101 enables improving the airflow in a typically critical area of the convertiplane 1 such as the connection area between the respective wing 3, fuselage 2 and air intake 46 in particular, to avoid or minimise taking boundary-layer flow into the air intake 46. The shape of the casing 40, in particular the air intake 46 and/or exhaust duct 47, enables minimising visible trails in the infrared spectrum of the engine 4 during the flight of the convertiplane 1.

The convertiplane 1 may also comprise a hybrid propulsion system 50, which transmits power from the engines 4 to the rotors 5.

More specifically, the hybrid propulsion system 50 comprises:
thermal engines 4;
a pair of electric generators 51, operatively connected to the respective engines 4 to receive mechanical power;
a pair of electric motors 52, electrically connected to the electric generators 51 to receive electric power and connected to the hubs 7 of the rotors 5;
a mechanical transmission 53 (only schematically shown in FIGS. 1 to 3 and 15), interposed between the engines 4 and the electric generators 51; and
an electric transmission 54 (only schematically shown in FIGS. 1 to 3 and 15), interposed between the electric generators 51 and the electric motors 52.

Preferably, there is also a mechanical transmission (not shown) interposed between the electric motors 52 and the respective rotor hubs 7.

In the case shown, the electric motors 52 are housed inside respective nacelles 10.

The electric generators 51 are interposed along the axis E between the engines 4. The electric generators 51 are also fixed to the fuselage 2.

Preferably, the hybrid propulsion system 50 is configured so as to allow the operation of both the electric motors 52 even in the event of failure of one of the engines 4 and/or electric generators 51 through the other one of the engines 4 and/or electric generators 51 still operating.

Furthermore, each engine 4 is sized so as to be able to supply both the electric generators 51 with sufficient mechanical power to ensure that the electric generators 51 power the electric motors 52 with sufficient electric power to enable correct operation of both rotors 5.

To this end (FIG. 15), the mechanical transmission 53 preferably comprises:
a pair of transmission units 57 interposed between one engine 4 and respective electric generators 51; and
a pair of transmission units 58 interposed between the other engine 4 and respective electric generators 51.

Each electric generator 51 is connected to both electric motors 52, and is sized so as to be able to power both electric motors 52 with a sufficient electric power to enable the correct operation of both the rotors 5.

The electric transmission 54 preferably comprises:
a pair of transmission units 67 interposed between one electric generator 51 and respective electric motors 52; and
a pair of transmission units 68 interposed between the other electric generator 51 and respective electric motors 52.

Alternatively, each pair of transmission units 67 and 68 can be implemented via a single electric power connection.

The system 50 also comprises a pair of electric power sources electrically connected in a selective manner to the respective electric motors 52. These sources 56 are selectively activatable so as to be able to power the respective electric motors 52 with an increase of electric power for a limited time interval, for example 30 seconds, in the event of failure of one of the engines 4/electric generators 51, so as to enable an emergency manoeuvre to be performed.

In one embodiment of the present invention, the fuselage 2 also comprises:
a cargo compartment 60; and
at least one opening 61 for access to the cargo compartment 60; and
a support element 70, normally housed inside the cargo compartment 60 and selectively movable through the opening 61 to the outside of the fuselage 2.

Figure 5:
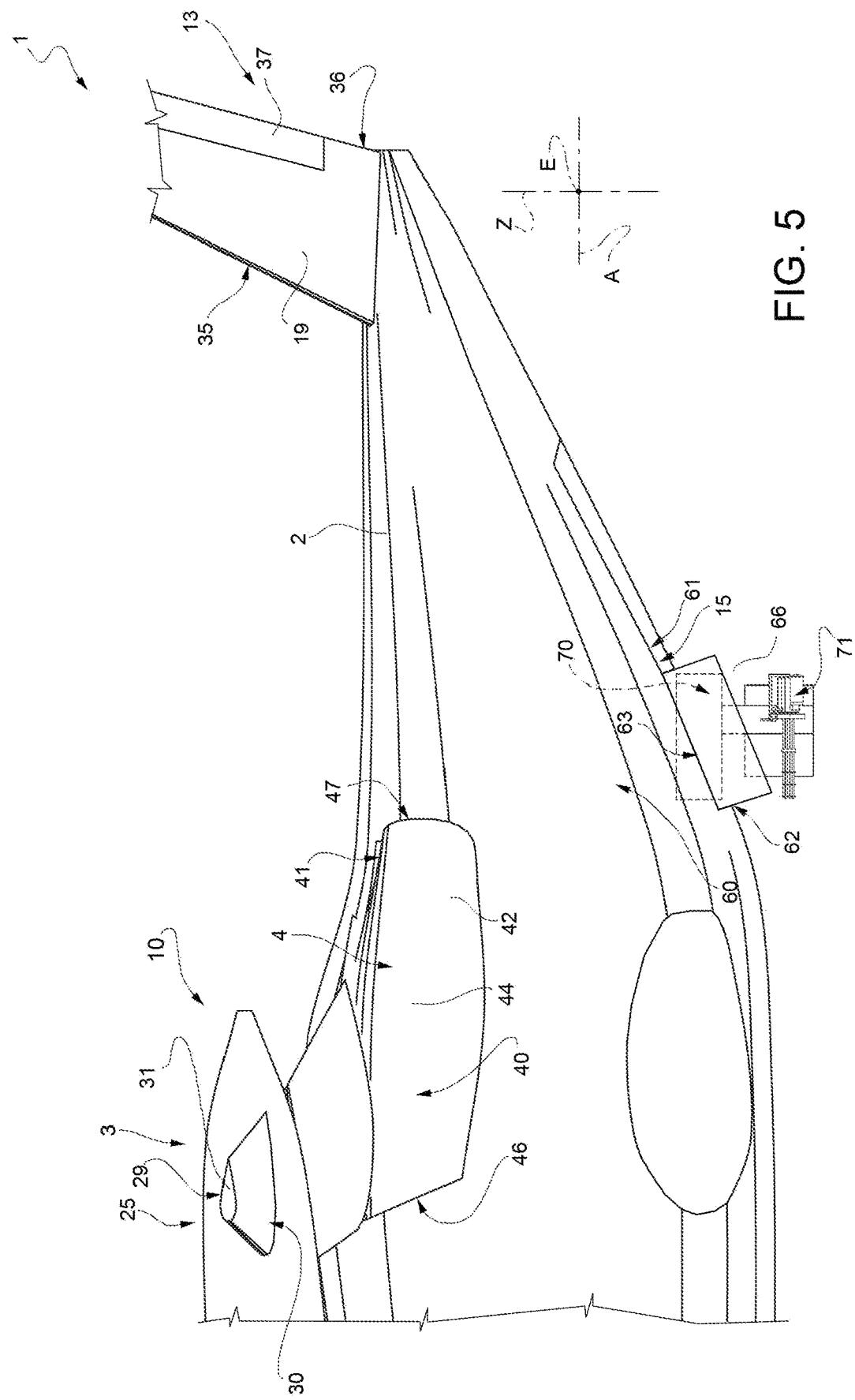
FIG. 5 shows a side view of the convertiplane of FIGS. 1 to 4 and the support apparatus in a second operating condition.

The cargo compartment 60 is arranged in a position interposed between the wings 3 and the tail portion 13 along the axis A, as shown in FIG. 5.

The opening 61 is delimited by a pair of edges 62, 63, respectively front and rear, opposite to each other and respectively arranged towards the nose 12 and the tail portion 13.

In addition, the opening 61 is delimited by a pair of lateral edges 64, 65, arranged adjacent to respective sides of the fuselage 2 and extending between the edges 62, 63.

The opening 61 is obtained in a portion 15 of the fuselage 2 extending at progressively increasing distances from the undercarriages 6, proceeding from the wings 3 towards the tail portion along the axis A.

The support element 70 defines a station 71 for weaponry or some other object.

When the support element 70 is positioned outside of the cargo compartment 60 and the fuselage 2, the station 71 is interposed between the rotors 5 along the axis E so as not to interfere with the rotors 5 along the axis A.

The convertiplane 1 comprises a pair of panels 66 hinged to respective edges 64, 65.

The panels 66 are selectively movable between:
respective closed positions, where they face each other, are coplanar and fully engage the opening 61, preventing access to the cargo compartment 60; and
respective open positions, where they are arranged along respective planes parallel to and separated from each other, leaving the opening 61 completely free and allowing access to the cargo compartment 60.

In greater detail, when arranged in the respective closed positions, the panels 66 are contiguous with the fuselage 2.

Contrariwise, when arranged in the respective open positions, the panels 66 protrude in a cantilever fashion below the fuselage 2 towards the undercarriages 6.

In particular, the panels 66 replace a loading ramp and are designed to allow the entry of people and/or loading of objects inside the cargo compartment 60.

The support element 70 is constrained to the fuselage 2 inside the cargo compartment 60 such that it can slide along a straight path parallel to the axis Z between:
a retracted position (FIG. 4), where it is completely housed within the cargo compartment 60; and
an extracted position (FIGS. 5, 6 and 7), where it is arranged outside of the cargo compartment 60.

The element 70 passes through the opening 61 during the travel between the retracted and extracted positions.

In use, the convertiplane 1 lands and takes-off in the "helicopter" configuration and advances in the "aeroplane" configuration.

In the "helicopter" configuration, when hovering or at low speed, the lift necessary to sustain the convertiplane 1 is provided by the rotors 5 arranged with the respective axes B orthogonal to the axes A and E.

In the "aeroplane" configuration, the lift necessary to sustain the convertiplane 1 is mainly provided by the wings 3.

In both conditions, the interconnection shaft 11 ensures that both rotors 5 continue to operate in the event of failure of one of the engines 4, thereby allowing complete operability of the convertiplane 1.

The system 50 also transmits mechanical power from the engines 4 to the rotors 5.

More specifically, the engines 4 provide mechanical power to the electric generators 51 via the mechanical transmission 53.

The electric generators 51 provide electric power to the electric motors 52 via the electric transmission 54. The electric motors 52 connected to the hub 7 thus drive the masts 9 in rotation about the respective axes B.

In the event of failure of one of the engines 4, the other engine 4 provides a sufficient value of mechanical power to both electric generators 5 to allow the correct operation of both rotors 5.

In the event of failure of one of the electric generators 51, the other electric generator 51 provides sufficient electric power to both electric motors 52 to allow the correct operation of both rotors 5.

In the event of failure of one of the engines 4/electric generators 51 and it becomes necessary to perform an emergency manoeuvre, the electric power source 56 is activated so as to supply the electric motors 52 with a surplus of electric power.

In the case of level flight at constant speed in the "aeroplane" configuration, it is possible to deactivate one of the engines 4, or arrange it to a minimum speed of rotation, and activate it, or increase the speed of rotation, in the event of an emergency manoeuvre.

Figure 4:
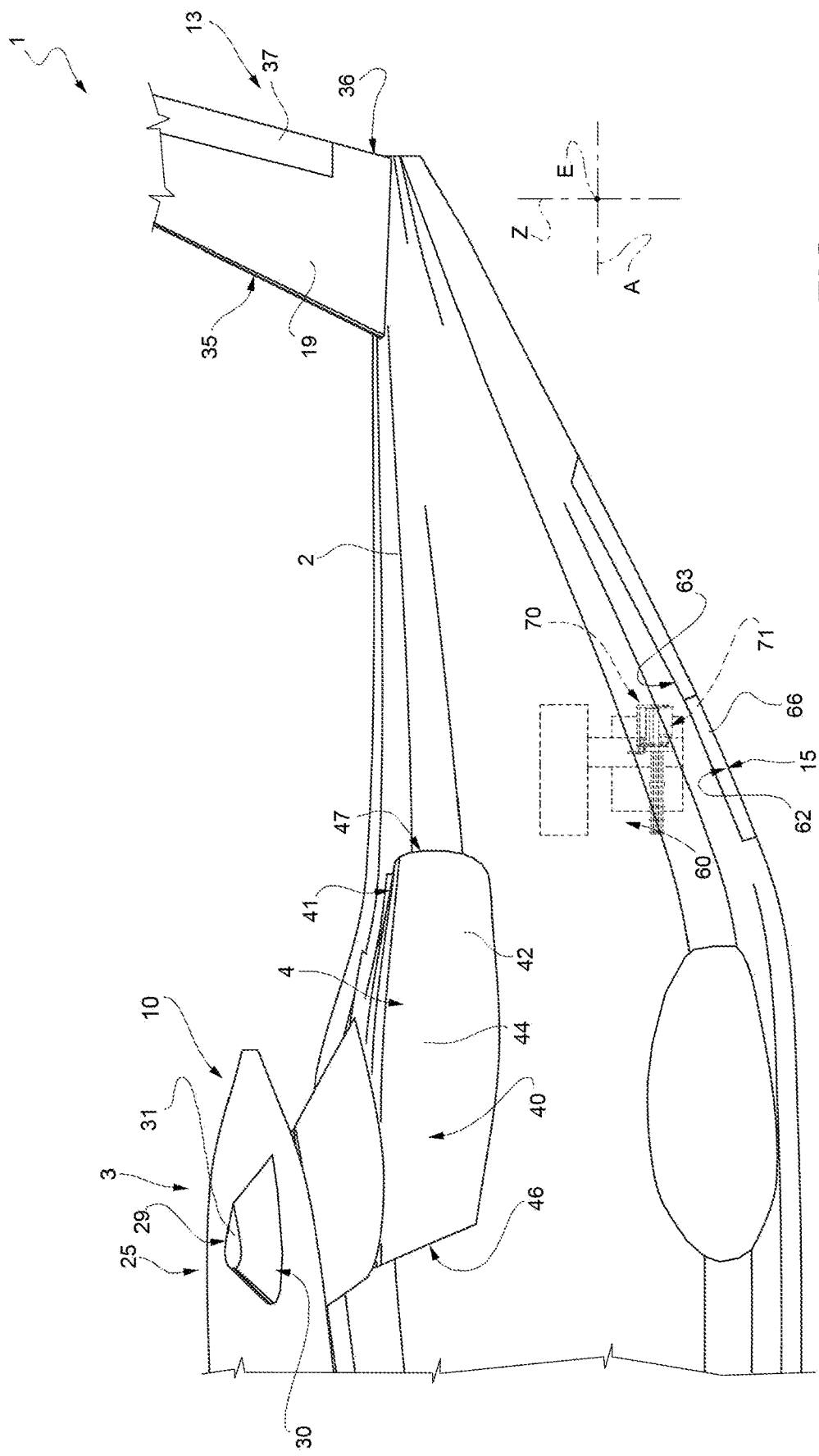
FIG. 4 is a side view, on a highly enlarged scale, of the convertiplane of FIGS. 1 to 3 according to a first embodiment, with parts removed for the sake of clarity.
Figure 8:
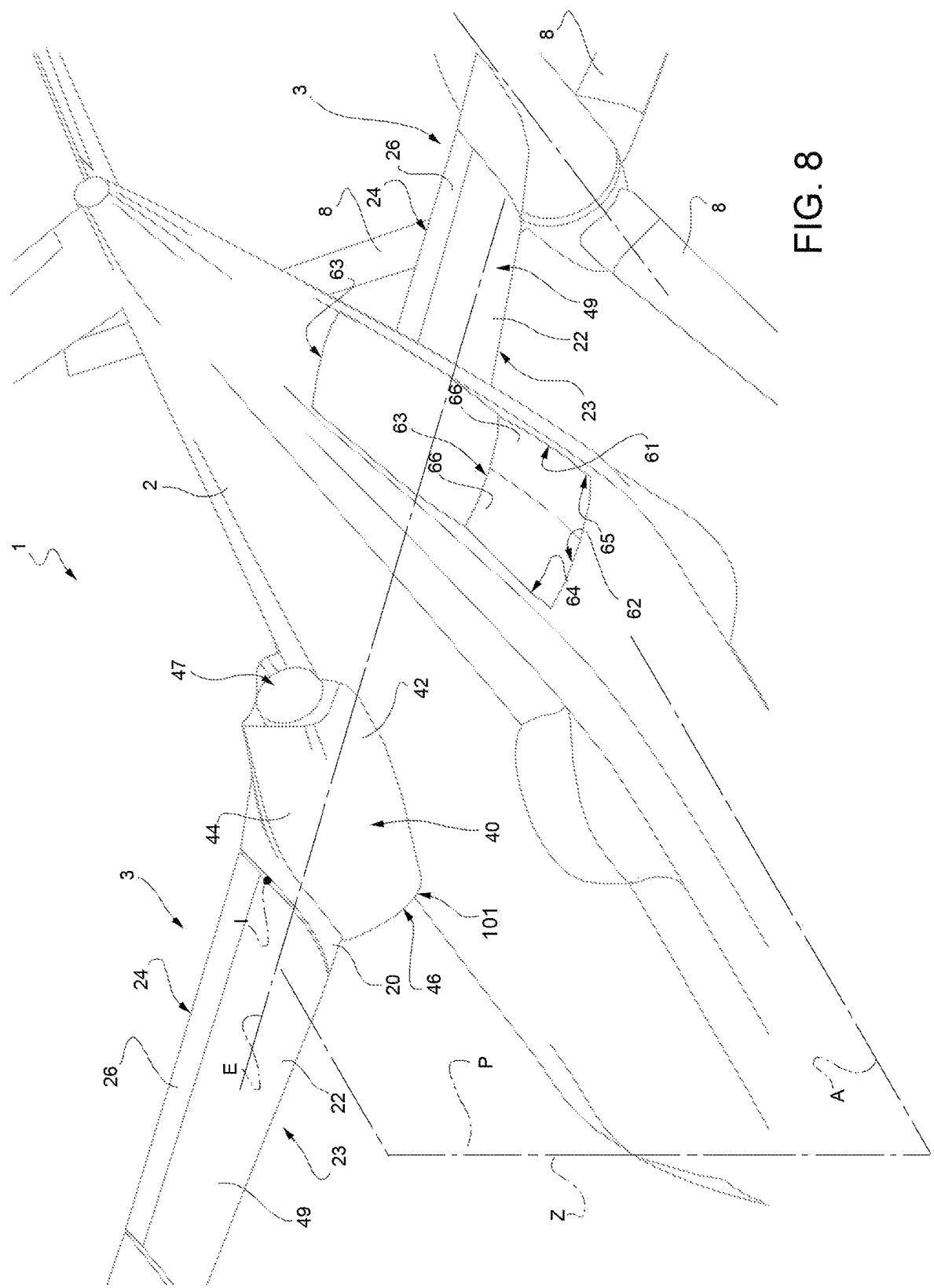
FIGS. 8 and 9 show further details of the convertiplane of FIGS. 1 to 7 on a further enlarged scale, seen in perspective from different viewpoints below.
Figure 9:
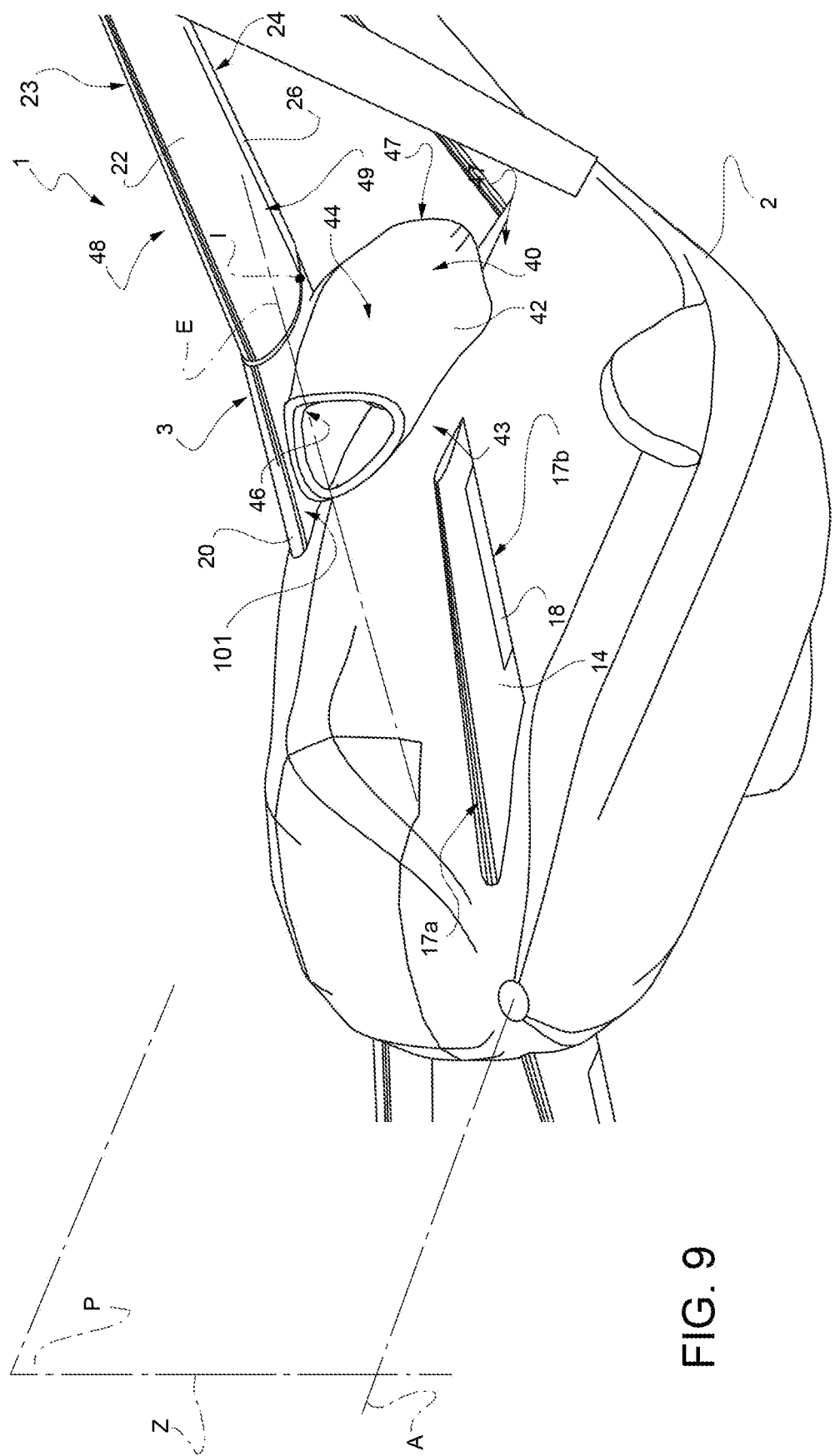
Figure 10:
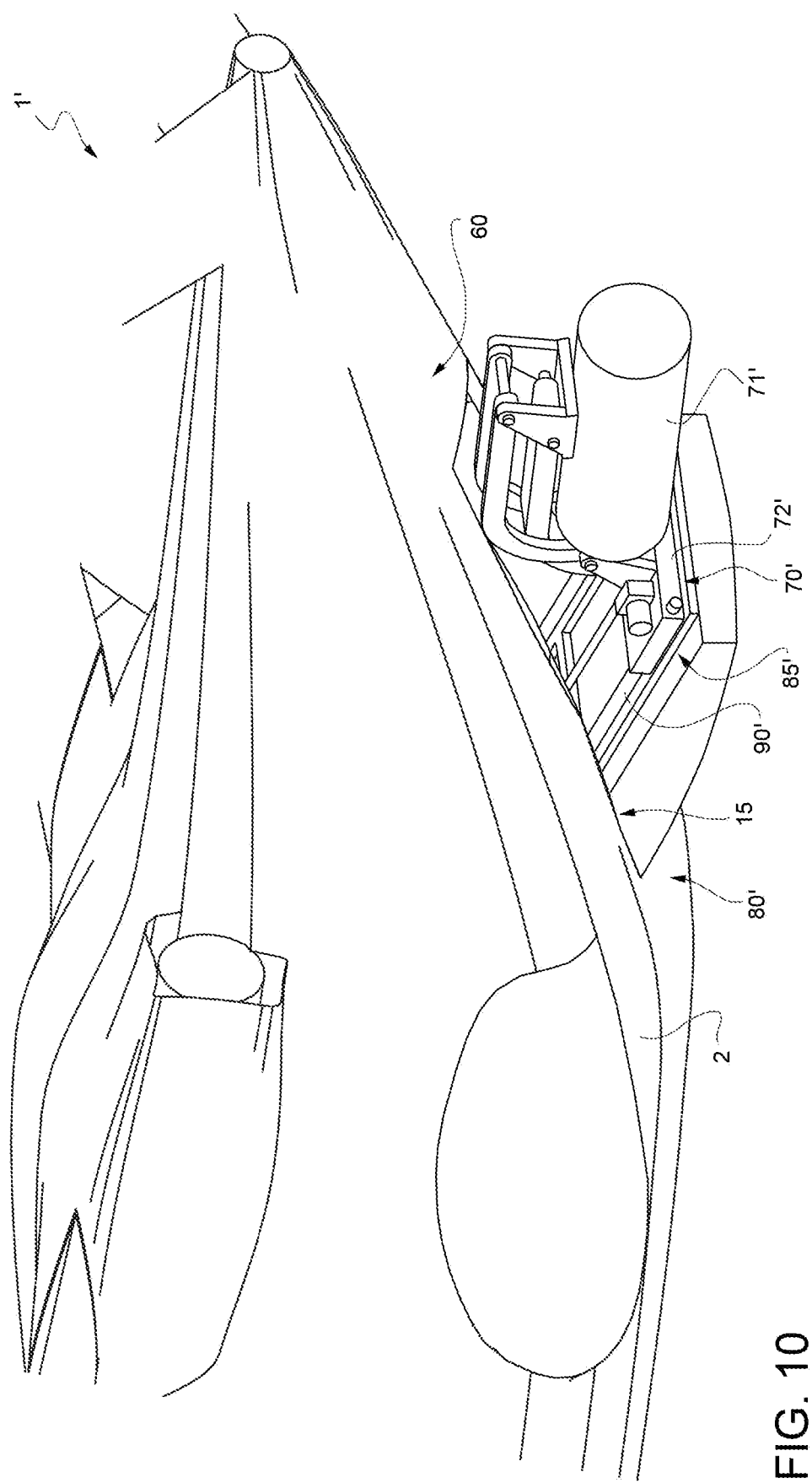
FIGS. 10 to 14 show a second embodiment of the convertiplane according to the present invention, in a sequence of operating steps.
Figure 11:
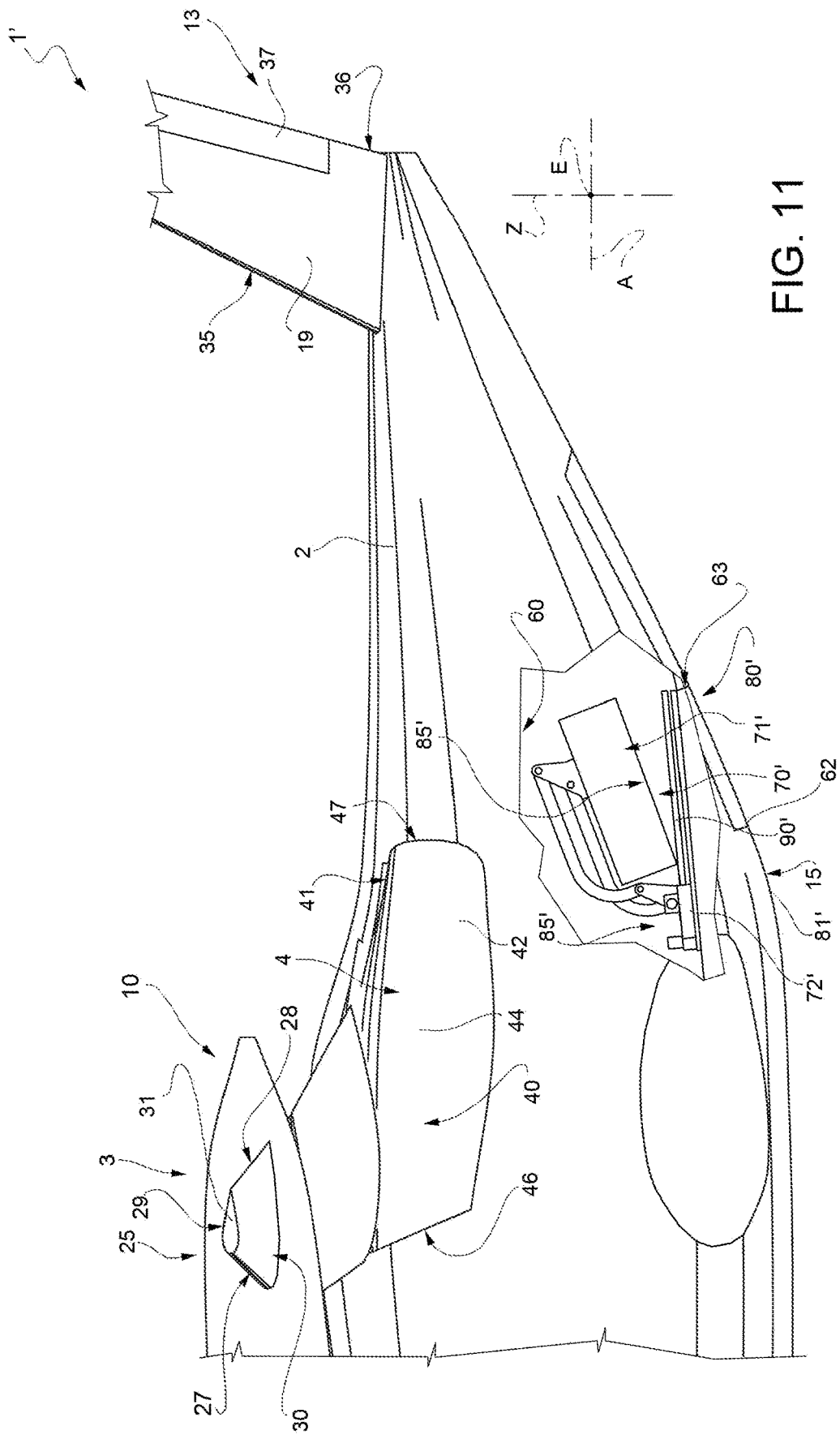

The panels 66 are normally arranged in the respective closed positions and the support element 70 is housed inside the cargo compartment 60 in the retracted position (FIGS. 4 and 8).

Figure 6:
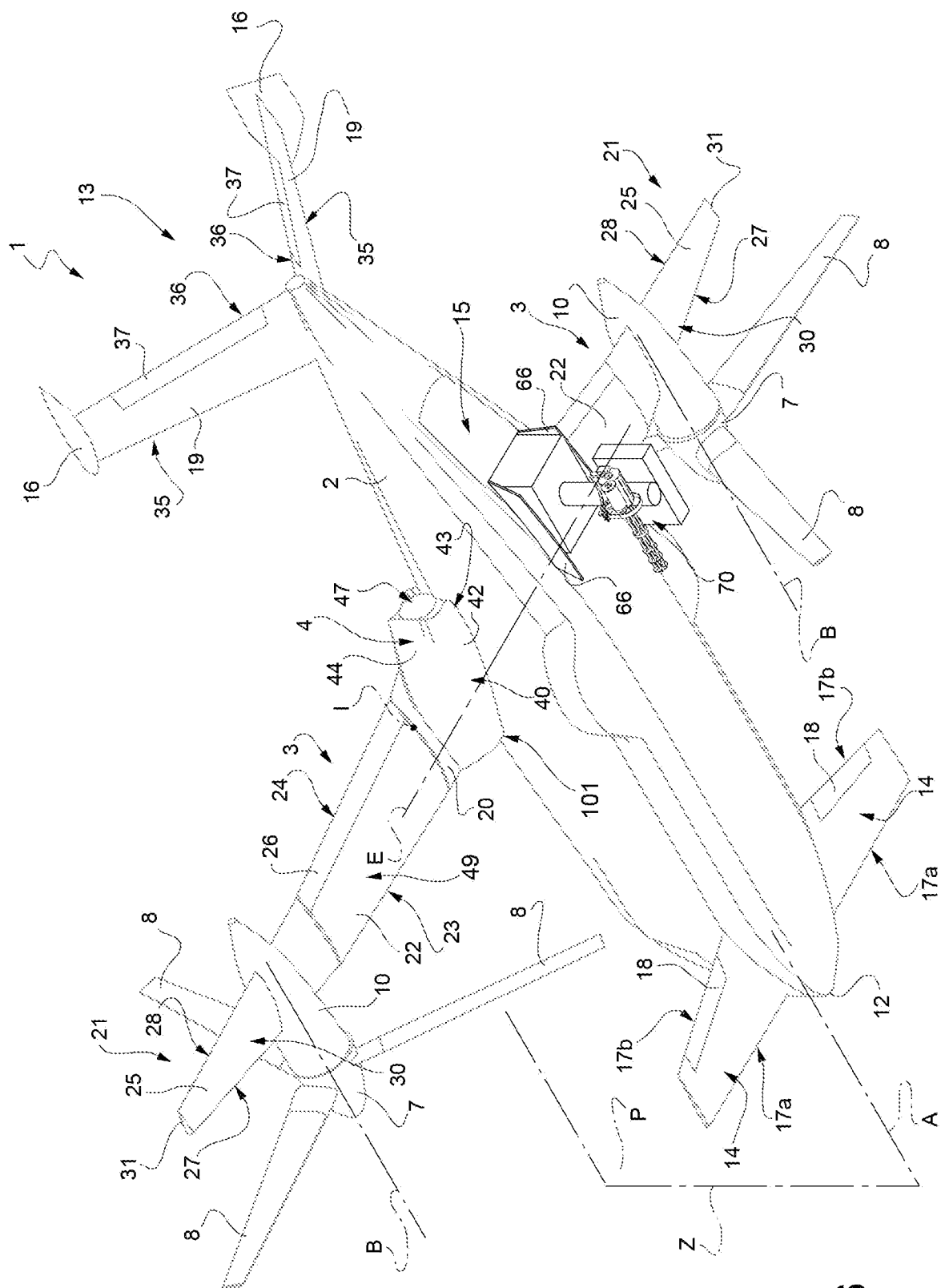
FIG. 6 shows a perspective view, from below, of the convertiplane of FIGS. 1 to 5 and the support apparatus in the second operating condition.
Figure 7:
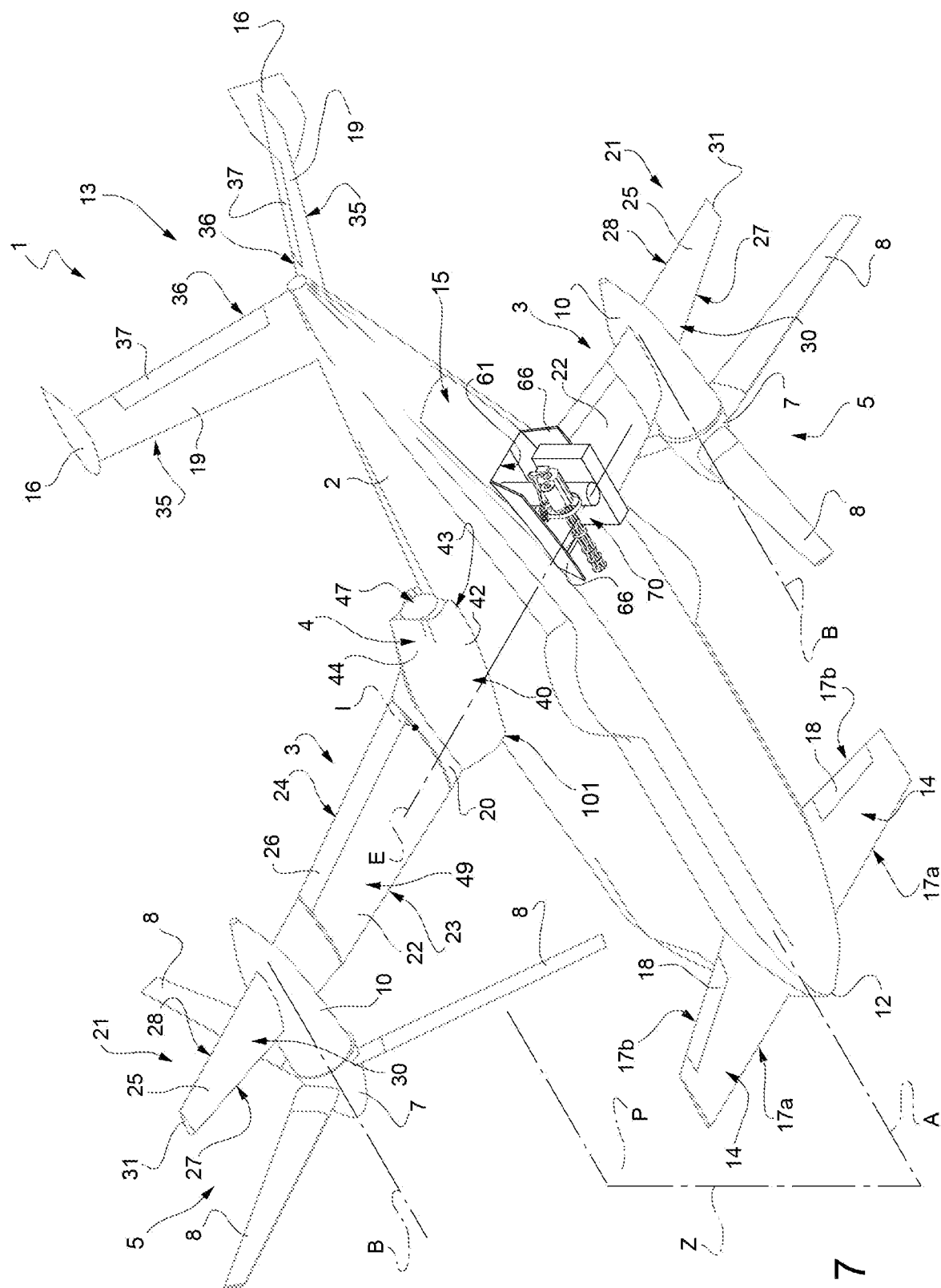
FIG. 7 shows a perspective view, from below, of the convertiplane of FIGS. 1 to 6 and the support apparatus in a third operating condition, which is intermediate between the first and the second operating conditions.

Starting from this condition, when necessary, the panels 66 are positioned in the respective open positions and the support element 70 is lowered along a vertical path until it passes through the opening 61 and reaches the extracted position (FIGS. 5, 6 and 7).

At this point, the station 71 is interposed between the rotors 5 along the axis E. In consequence, any interference between the rotors 5 and the equipment arranged on the station 71, for example a weapon or a camera, is avoided.

Afterwards, the support element 70 is returned from the extracted position to the retracted position through the opening 61 and the panels 66 are again positioned in the respective closed positions.

Referring to FIGS. 11 to 14, a further embodiment of the convertiplane 1' according to the present invention is shown.

The convertiplane 1' is similar to convertiplane 1 and will be described hereinafter only with regard to the differences; where possible, the same or equivalent parts of the aircrafts 1, 1' will be indicated with the same reference numerals.

In particular, the convertiplane 1' differs from the convertiplane 1 in that it comprises only one panel 80' instead of the panels 66.

The panel 80' is movable with respect to the fuselage 2 by rotation about the front edge 62 of the opening 61, between:

a closed position (FIG. 11), where it is arranged contiguously with the fuselage 2, blocks the opening 61, makes contact with the edges 62, 63, 64, 65 and prevents access to the cargo compartment 60; and an open position (FIGS. 12, 13 and 14), where it is fixed to edge 62, extends at a progressively increasing distance from the fuselage 2 proceeding from the edge 62 towards the edge 63 and gives free access to the opening 61.

In the case shown, the panel 80' is hinged to the front edge 62 of the opening 61 and has a free end edge 81' opposite to edge 62.

When the convertiplane 1' is on the ground and the panel 80' is arranged in the open position, the panel 80' defines the load ramp for loading people and/or equipment inside the cargo compartment 60.

The support element 70' differs from the support element 70 in that it comprises a pair of slides 72' to which a station 71' is hinged about an axis H' parallel to the edges 62, 63.

Support element 70' also differs from the support element 70 in that it is movable, when the panel 80' is in the open position, along an extraction trajectory between:

an initial position (FIG. 12), where the slides 72' are arranged adjacent to the edge 62 of the opening 61 and the station 71' is arranged above the panel 80'; and an intermediate position (FIG. 13), where the slides 72' are arranged on the edge 81' and the station 71' is arranged rearward of the panel 80'; and a final position (FIG. 14), where the slides 72' are arranged on edge 81' and the station 71' is arranged below the panel 80'.

More specifically, the support element 70' is movable, through integral translation of the station 71' and the slides 72', between the initial position and the intermediate position, and is movable through rotation of the station 71' with respect to the slides 72' between the intermediate position and the final position.

The convertiplane 1' also differs from the convertiplane 1 in that it comprises a constraint assembly 85' designed to constrain the support element 70' to the panel 80' in a movable manner.

In greater detail, the constraint assembly 85' comprises a pair of straight guides 90' parallel to each other, fixed to respective mutually opposite edges of the panel 80' and on which the slides 72' can slide, during translation of the support element 70' between the initial position and the intermediate position and vice versa when the panel 80' is in the open position.

The operation of the convertiplane 1' differs from that of the convertiplane 1 in that if it becomes necessary to use the station 71', the support element 70' is moved in the following manner after the panel 80' has been arranged in the open position.

Figure 12:
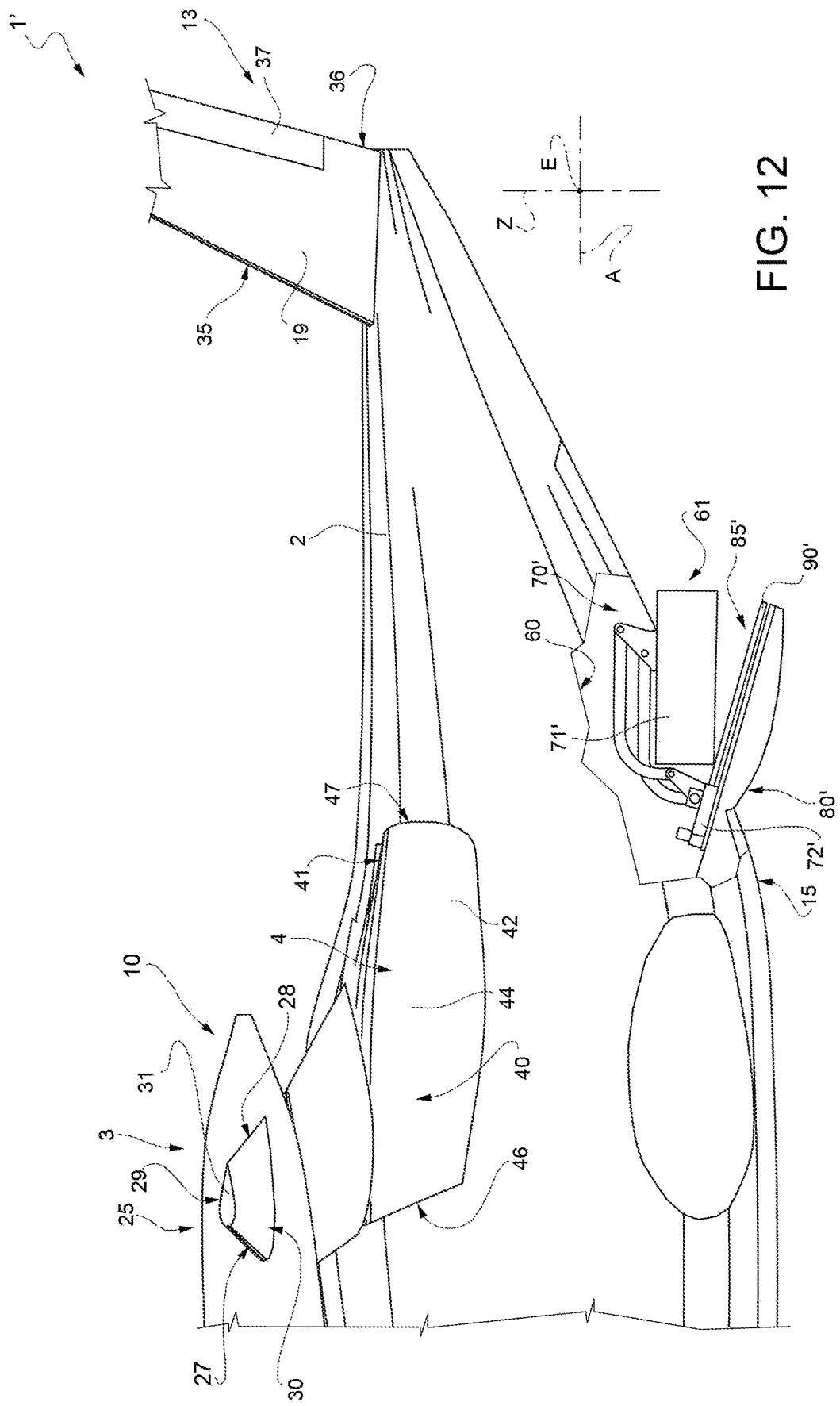
Figure 13:
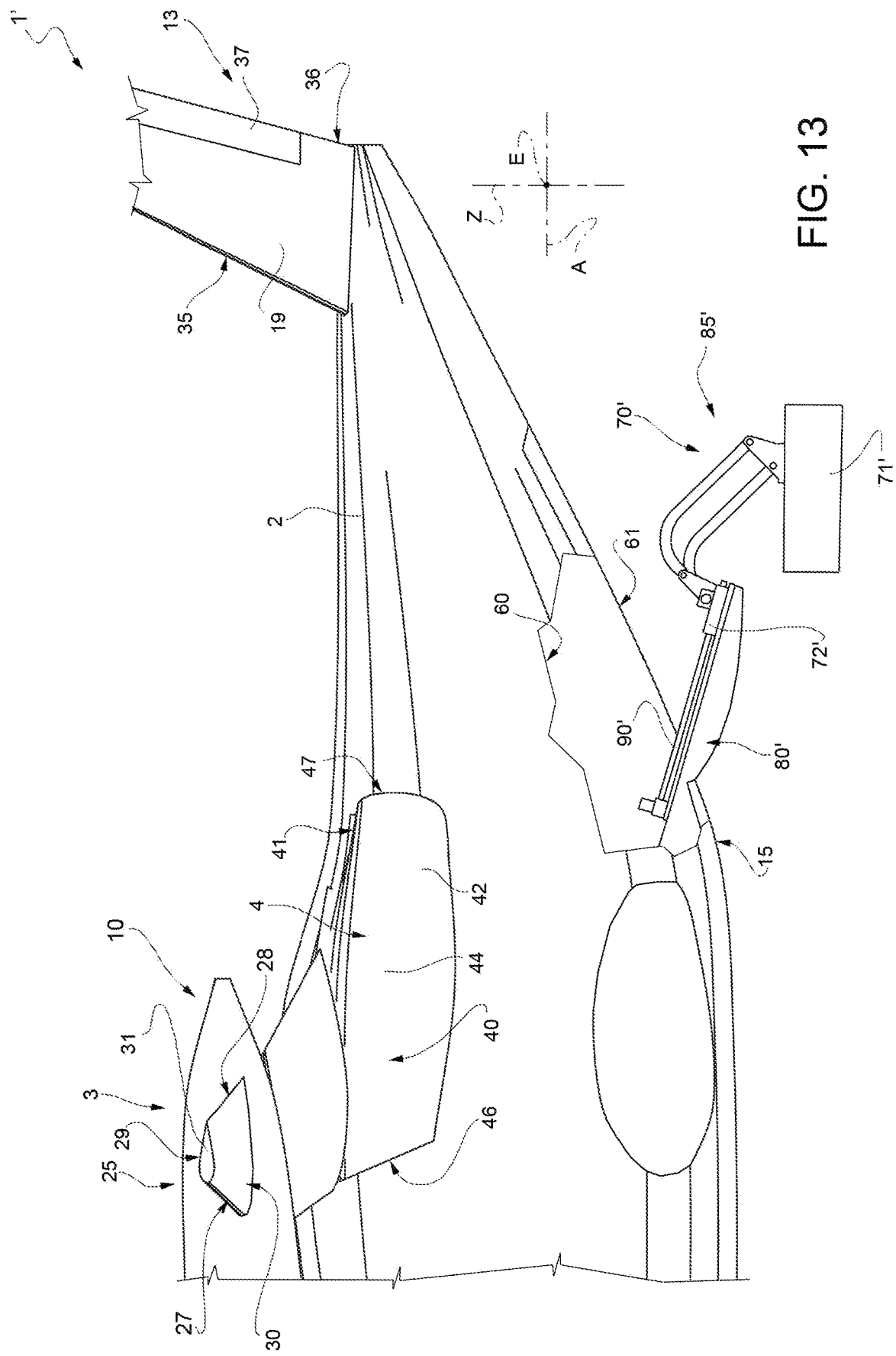

In this condition, the support element 70' is arranged in the initial position, where the slides 72' are arranged adjacent to edge 62 and the station 71' is arranged above the panel 80' (FIG. 12).

Then, the slides 72' of the support element 70' slide along the guides 90' integrally with the station 71' until the edge 81' is reached. At this point, the support element 70' is arranged in the intermediate position (FIG. 13) and the station 71' is arranged rearward to the panel 80'.

Figure 14:
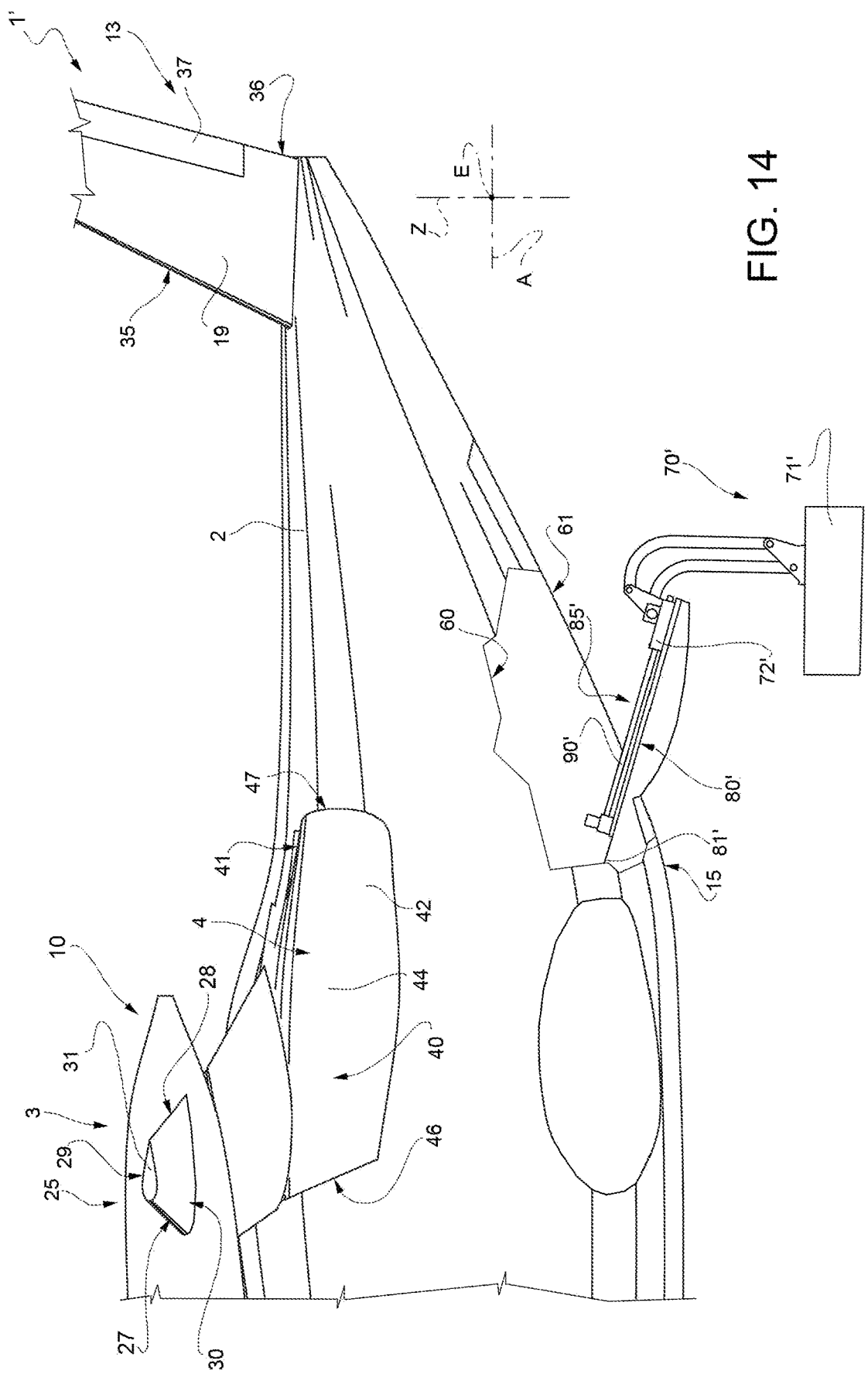
Figure 15:
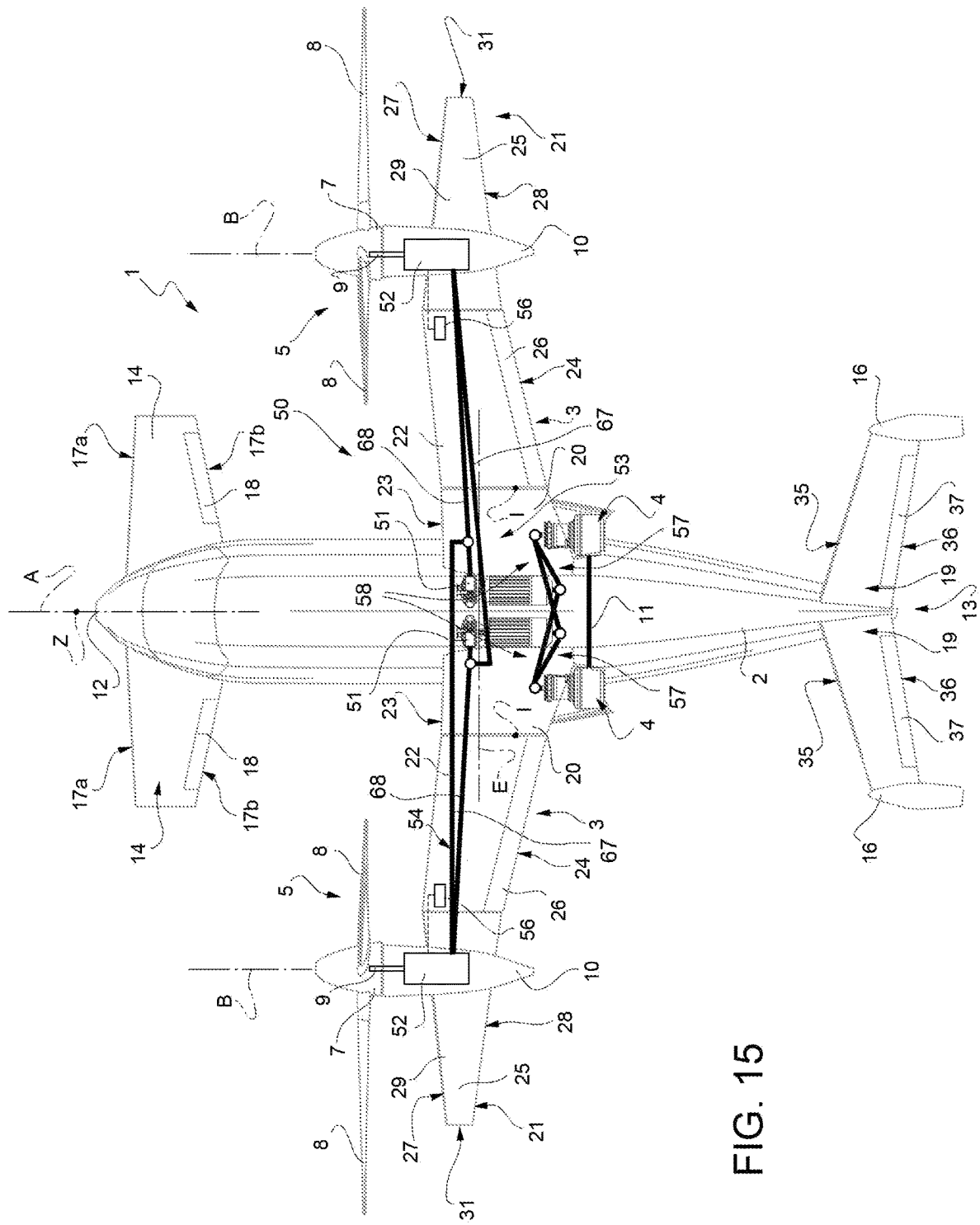
FIG. 15 is a plan view of the first embodiment of the convertiplane according to the present invention in the "helicopter" configuration, showing further details with respect to FIG. 3.

Lastly, the station 71' is turned about the axis H' around the slides 72' until it is arranged below the panel 80' (FIG. 14).

The support element 70' is returned from the final position to the intermediate position and from the latter to the initial position and the panel 80' is returned to the closed position.

Figure 16:
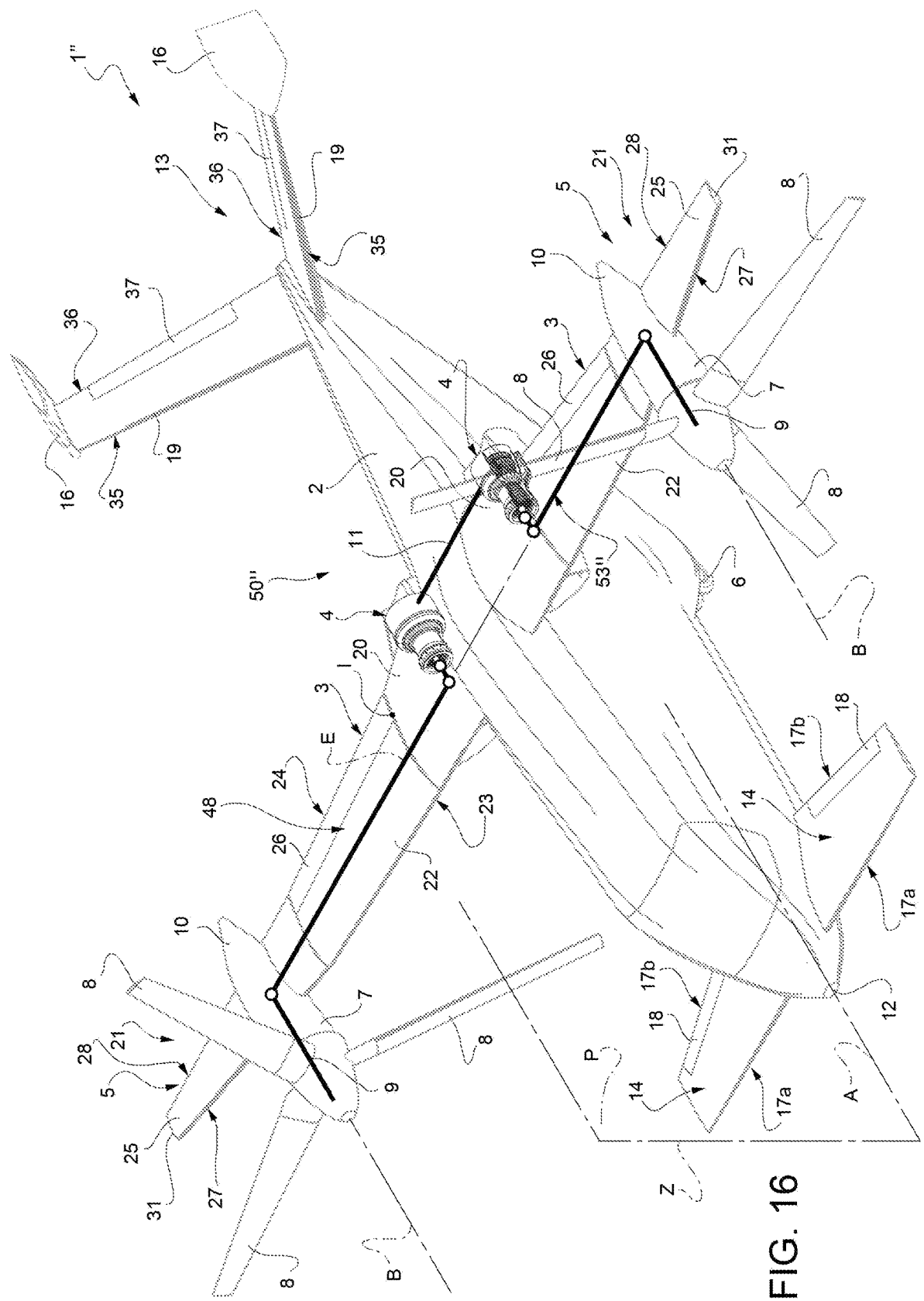
FIG. 16 is a perspective view of a third embodiment of the convertiplane according to the present invention in the "aeroplane" configuration.

Referring to FIG. 16, a third embodiment of the convertiplane 1" according to the present invention is shown.

The convertiplane 1" is similar to the convertiplane 1 and will be described hereinafter only with regard to the differences; where possible, the same or equivalent parts of the aircrafts 1, 1" will be indicated with the same reference numerals.

In particular, the convertiplane 1" differs from the convertiplane 1 in that the system 50" does not comprise the electric generators 51, the electric motors 52 and the electric transmission 54.

The convertiplane 1" also differs from the convertiplane 1 in that the mechanical transmission 53" connects the engines 4 and the masts 9 of the rotors 5.

The operation of the convertiplane 1" differs from that of the convertiplane 1 in that the thermal engines 4 directly drive the masts 9 of the rotors 5.

From an examination of the characteristics of the convertiplane 1, 1', 1" according to the present invention, the advantages that can be attained therewith are evident.

In particular, unlike the known types of convertiplanes described in the introductory part of this description, the engines 4 are interposed between the rotors 5 along the directions of extension of the relative wings 3.

More precisely, the engines 4 are positioned in an interface corner between the fuselage 2 and the respective wings 3, and are connected to respective sides of the fuselage 2.

Thanks to this configuration, in the event of an emergency vertical landing, the bending moments acting on the wings 3 due to the weight of the engines 4 are drastically reduced with respect to the known types of convertiplanes described in the introductory part of this description. In addition, the interconnection shaft 11 has a particularly short length with respect to the aforementioned known solutions and is consequently subjected to lower twisting and bending moments for the same amount of transmitted torque. Finally, the position of the engines 4 particularly close to the fuselage 2 facilitates the possible folding of the wings 3 to arrange the convertiplane 1, 1', 1" in a stowage configuration, not shown. These operations are further facilitated in that portions 22 are hinged to respective portions 20 and can thus be turned about the respective axes I with respect to the respective portions 20.

The system 50 has the following advantages.

Firstly, the electric generators 51 are interposed between the electric motors 52 along the axis E and the engines 4 are arranged on respective interface corners between fuselage 2 and respective wings 3. In consequence, similarly to the interconnection shaft 11, the transmission 53 also has particularly small dimensions along the axis E and is consequently subject to lower twisting and bending moments with respect to the solutions of a known type described in the introductory part of this description.

Secondly, each engine 4 is mechanically connected to both electric generators 51 and is sized so as to be able to power both the electric generators 51 to generate a level of electric power such as to allow the correct operation of the rotors 5.

This means that in the event of failure of one of the engines 4, it is possible to preserve the correct supply of mechanical power to the rotors 5 and the correct operation of the convertiplane 1, 1', 1".

Moreover, it is possible to deactivate, or operate at a minimum speed of rotation, one of the engines 4 and only activate it only when it necessary to make supplementary electric power available for the electric generators 51.

Secondly, each electric generator 51 is connected to both the electric motors 52 and is sized so as to be able to electrically power both the electric motors 52 with the correct value of electric power, in the event of failure of the other electric generator 51.

In consequence, it is possible to preserve the correct operability of the convertiplane 1, 1', 1" in the event of failure of one of the electric generators 51, further increasing the redundancy level of the hybrid propulsion system 50.

Thirdly, the selective activation of the electric power source 56 enables being able to power the respective electric motors 52 with an increase in electric power for a limited period of time, for example 30 seconds, in the event of failure of one of the engines 4/electric generators 51, so as to enable an emergency manoeuvre to be performed.

Fourthly, each rotor 5 is driven in rotation by a relative electric motor 52. It is thus possible to manage the rotational speed of each engine 4 and the rotational speed of the relative electric motor 52 in a completely independent manner. This allows regulating the rotational speed of each rotor 5 independently of the rotational speed of the relative engine 4. It is thus possible to quickly adjust the operation of the rotors 5 to the different operating conditions of the convertiplane 1, 1', 1", while keeping the engines 4 in a minimum fuel consumption condition.

The support elements 70, 70' enable setting, during a flight configuration of the convertiplane 1, 1', 1", the station 71, 71' in a position below the fuselage 2 and interposed along the axis E between the rotors 5.

In this way, the extension of the station 71, 71' along the axis A interferes neither with the rotors 5 nor the fuselage 2.

It is thus possible to arrange a weapon on the station 71, 71' without causing any risk of damage to the convertiplane 1, 1', 1".

The panel 80' is advantageously used both as a loading ramp when the convertiplane 1' is on the ground and for constraining the support element 70' to the convertiplane 1' and allowing its movement between the initial and final positions.

It is clear that modifications and variants can be made to the convertiplane 1, 1', 1" set forth herein without departing from the scope defined in the claims.

In particular, the convertiplane 1 could comprise only one engine 4.

In addition, each tip portion 21 might not comprise a section adjacent to the respective portion 22. In this case, each tip portion 21 would only comprise the respective rotor 5 with the respective nacelle 10 and the respective free end 31.

Finally, the cargo compartment 60, the opening 61 and the support element 70, 70' could be installed in a helicopter instead of in the convertiplane 1, 1', 1".

The invention claimed is:

1. A convertiplane (1, 1', 1") comprising:
   a fuselage (2) having a first longitudinal axis (A) and, in turn, comprising a nose (12) and a tail portion (13);
   a pair of wings (3) arranged on respective opposite sides of said fuselage (2), carrying respective rotors (5) and generating a lift value; a pair of engines (4) of the thermal type and operatively connected to said rotors (5);
   a pair of electric motors (52) operatively connected to respective said rotors (5) and adapted to drive the rotors (5) in rotation;

a pair of electric generators (51) electrically connected to respective said electric motors (52) and operatively connected to respective said engines (4); and an interconnection shaft (11) interposed between said engines (4) and arranged in the said fuselage (2) for the greater parts of its width;

each said rotor (5), in turn, comprising a mast (9) rotatable about a second axis (B);

said mast (9) of each said rotor (5) being integrally tiltable with said second axis (B) about a relative third axis (E) transversal to said second axis (B) and with respect to said fuselage (2), so as to set said convertiplane (1, 1', 1") between a helicopter configuration and an aeroplane configuration;

each said second axis (B) being, in use, transversal to said first axis (A) of said convertiplane (1, 1', 1") in said helicopter configuration and being, in use, substantially parallel to said first axis (A) in said aeroplane configuration;

said engines (4) being interposed between said rotors (5) along a direction of extension of the relative said wing (3);

said engines (4) being arranged below and connected to a bottom surface (49) of the relative wing (3) with reference to a normal operating configuration of said convertiplane (1, 1', 1") set, in use, in said aeroplane configuration;

wherein said engines (4) are arranged at a connection interface between said fuselage (2) and the relative said wing (3);

each said engine (4) being arranged at a root portion of the relative said wing (3);

said engines (4) being positioned in respective interface corners between said fuselage (2) and respective said wings (3), and being connected to respective sides of said fuselage (2);

wherein each said wing (3), in turn, comprises:
a first portion (20), fixed with respect to said fuselage (2);
a second tip portion (21), integrally tiltable with the relative said mast (9) about the relative said third axis (E); and
a third intermediate portion (22), which is interposed between the respective said first portion (20) and the respective said tip portions (21);

said third intermediate portion (22) of each wing (3) being hinged to said first portion (20) of the respective wing (3) about a respective fourth axis (I).

2. The convertiplane according to claim 1, wherein said fourth axes (I) are incident with one another in a longitudinal plane (P) of said convertiplane (1) comprising said first axis (A); or wherein said fourth axes (I) are convergent to one another; or wherein said fourth axes (I) are skew.

3. The convertiplane according to claim 2, wherein said electric generators (51) are interposed between said engines (4) along said third axis (E).

4. The convertiplane according to claim 2, wherein said electric motors (52) are integrally tiltable with the respective said rotors (5) about the respective said third axes (E).

5. The convertiplane according to claim 2, wherein the convertiplane further comprises, for each said rotor (5):
a nacelle (10) housing the rotor (5) and the respective electric motor (52); and a hub (7) operatively connected to the respective mast (9) and mechanically connected to the respective electric motor (52).

6. The convertiplane according to claim 2, wherein each said engine (4) is operatively connected to both said electric generators (51) and is sized so as to provide a level of mechanical power necessary for powering both said electric generators (51) in the event of failure of the other said engine (4).

7. The convertiplane according to claim 2, wherein each said electric generator (51) is operatively connected to both said electric motors (52), and is sized so as to provide a level of electric power necessary for powering both said electric motors (52) in the event of failure of the other said electric generator (51).

8. The convertiplane according to claim 2, further comprising an electric energy source (56) operatively connectable to at least one of said electric generators (51) and operable, for a predetermined time, to provide additional electric power to said at least one of said electric generators (51).

9. The convertiplane according to claim 1, wherein said fuselage (2) comprises a cargo compartment (60) and at least one movable panel (66, 80') delimiting said cargo compartment (60);
said panel (66, 80') being selectively movable between:
a closed position, in which it closes said cargo compartment (60); and
an open position, in which it gives access to said cargo compartment (60) from the outside;
said convertiplane (1, 1', 1") further comprising a support element (70, 70') housed inside said cargo compartment (60) in a retracted position when said movable panel (66, 80') is in said closed position and movable to an extracted position outside of said cargo compartment (60);
said support element (70, 70') comprising a station (71, 71') for equipment; said station (71, 71') being interposed between said rotors (5) along said third axis (E) and offset from said fuselage (2) along said first axis (A), when said support element (70, 70') is in said extracted position.

10. The convertiplane according to claim 9, wherein said support element (70) is constrained in a sliding manner inside said cargo compartment (60) and is movable on a straight translation path along a fifth axis (Z), between said retracted and extracted positions, when said panel (66) is, in use, in said open position;
said fifth axis (Z) being transversal to said first and third axes (A, E);
or wherein said panel (80') defines a loading ramp when it is arranged in said open position and said convertiplane (1, 1', 1") is, in use, on the ground;
said support element (70') being constrained in a movable manner to said panel (80');
said support element (70') and said station (71') being integrally slidable with respect to one another along a translation path with respect to said panel (80'), between an initial position and an intermediate position, when said panel (80') is in said open position;
said station (71') being arranged in said intermediate position externally to said cargo compartment (60) and, in use, rearward of said panel (80'); and
said station (71') being hinged onto said support element (70') and being rotatable about the support element (70') between said intermediate position and a final position in which the station (71') is arranged outside said cargo compartment (60) and, in use, below said panel (80'), when said panel (80') is in said open position.

\* \* \* \* \*